J. V. DINSMORE.
Car Wheel.

No. 64,642.

Patented May 14, 1867.

Witnesses:
Samuel N. Piper
Geo. H. Andrews

Inventor:
J. V. Dinsmore
by his Attorney
H. H. Eddy

United States Patent Office.

JOHN V. DINSMORE, OF MILFORD, MASSACHUSETTS, ASSIGNOR TO HIMSELF AND MOSES HARRIS, OF THE SAME PLACE.

Letters Patent No. 64,642, dated May 14, 1867.

IMPROVED CAR-WHEEL.

The Schedule referred to in these Letters Patent and making part of the same.

TO ALL PERSONS TO WHOM THESE PRESENTS SHALL COME:

Be it known that I, JOHN V. DINSMORE, of Milford, in the county of Worcester, and State of Massachusetts, have invented a new and useful improvement in Railway-Carriage Wheels; and I do hereby declare the same to be fully described in the following specification, and represented in the accompanying drawings, of which—

Figure 1:
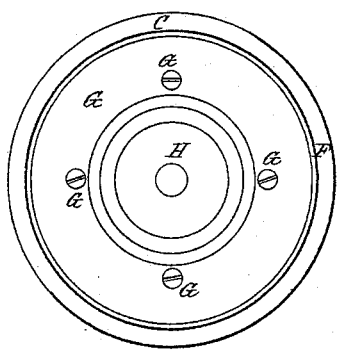
Figure 2:
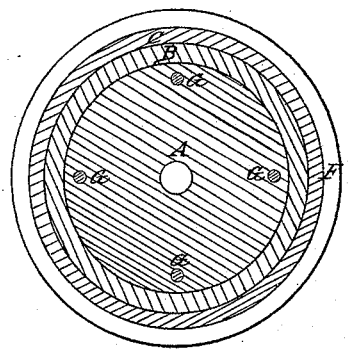
Figure 3:
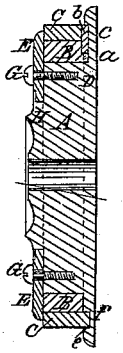

Figure 1 is a front elevation.
Figure 2, a longitudinal section; and
Figure 3, a transverse section of a wheel provided with my invention.

In this wheel the metallic tire encompasses and is supported in part by an elastic annulus or packing, which may be composed of vulcanized caoutchouc or other suitable equivalent material. The said elastic annulus encompasses and fits closely to the circumference of the inelastic body of the wheel. The tire and its elastic ring are arranged between and sustained laterally by two end supporters, one of which projects from the body of the wheel, and, with the said body and the flange, is cast or formed in one piece. The other end supporter is an annular cap affixed to the side of the body, the whole being as exhibited in the aforesaid drawings, in which—

Figure 4:
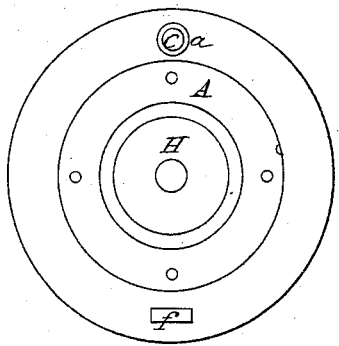
Figure 5:
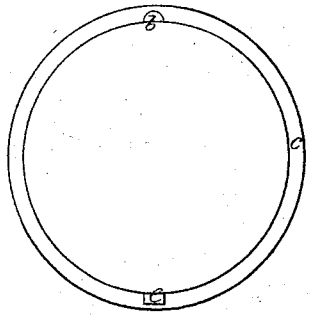

A denotes the body of the wheel; B the elastic annulus or ring; C the metallic tire; D E the end supporters; and F the flange. In order to prevent the tire from turning or slipping around on and with reference to the elastic annulus B, when the friction-brake of a carriage is applied to the periphery of the tire for the purpose of either arresting or diminishing the rotary motion of the wheel, and also to allow the tire play in radial directions on the wheel and between the two end supports as it necessarily must while in use, I combine with the tire, and each or either of its end supports, certain devices as follows, that is to say, I form chambers $a\ b$ in the end support and edge of the tire, and place in such a block, $c$. The chamber $a$ is circular, and the chamber $b$ semicircular, or thereabouts, in shape, the same being as represented in Figures 4 and 5. The first of such figures shows the wheel as it appears without the elastic ring and movable end support E. Fig. 5 is an inner edge view of the tire. In fig. 4 the block $c$ is represented as circular, and having a diameter somewhat less than that of the chamber $a$, in order that it may play or move up and down as well as laterally in the said chamber. In lieu of such devices, others which are equivalents may be employed, that is to say, there may be a projection, $e$, from the tire to enter a chamber or recess, $f$, made in the stationary end supporter, the said chamber being longer and wider than the projection. The movable end supporter E is an annular plate encompassing a hub, H, and fastened to the body of the wheel by means of a series of bolts or screws, G G G, which go through the supporter E and screw into the wheel body. The flange F projects beyond the tire in manner as exhibited in the drawings. The purpose of the elastic annulus encompassed by the tire is to prevent the tire from becoming stretched while in use, as it would be likely to be were it supported on an inelastic surface. The elastic annulus also serves to prevent noise as well as injury to the carriage, such as usually results from the passage of the wheel over joints of the rails of the railway. In this wheel the elastic ring is confined between four surfaces, viz, the periphery of the wheel body, the inner circumferance of the tire, and the inner sides or edges of the two end supporters. In this way the elastic ring is prevented from bulging laterally and projecting from the wheel and thus losing its elastic properties. In my wheel as the flange is separate from the tire, and is connected with and projects from one of the end supporters D E, the blows of the flange against the rails cannot operate to draw the tire off the elastic supporting ring as they would be likely to do were the tire and the flange in one piece.

I am aware that it is not new to make a carriage-wheel with an elastic tire composed of India rubber. I am also aware that it is not new to insert the elastic tire between flanges projecting from and beyond the outer periphery of the felloe. I am also aware that it is not new to make a carriage-wheel by constructing the felloe of two concentric annuli with a ring of caoutchouc, or other elastic equivalent, arranged between and concentric with them. I am also aware that it is not new to place a tube of India rubber within the hub of a wheel, and so as to encompass the journal-box thereof. I am also aware that it is not new to construct a railway-carriage wheel with a series of blocks of wood, or other elastic equivalent, arranged around the circumference of its body and in sockets made therein, and surrounded by a metallic tire having a flange formed in one piece with and projecting from such tire; therefore I make no claim to any such constructions.

What I claim as my invention, is as follows:

I claim the arrangement of the elastic packing or ring B, the inelastic tire C, the body A, the end supporters D E, and devices, substantially as described, (or their equivalents,) for preventing the tire from slipping around on the elastic ring and enabling such tire to vibrate or play in radial directions as specified.

JOHN V. DINSMORE.

Witnesses:
R. H. EDDY,
GEO. H. ANDREWS.